Feb. 12, 1957
H. E. RACH
2,780,886
SNELL ADAPTER FOR FISHHOOKS
Filed Nov. 28, 1955
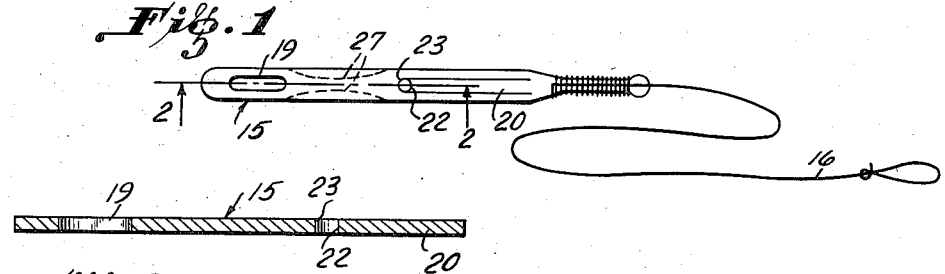
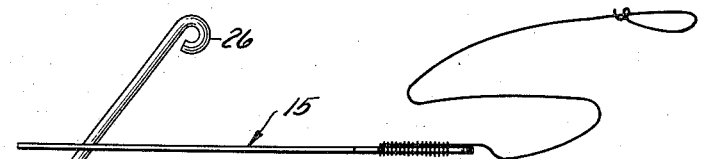
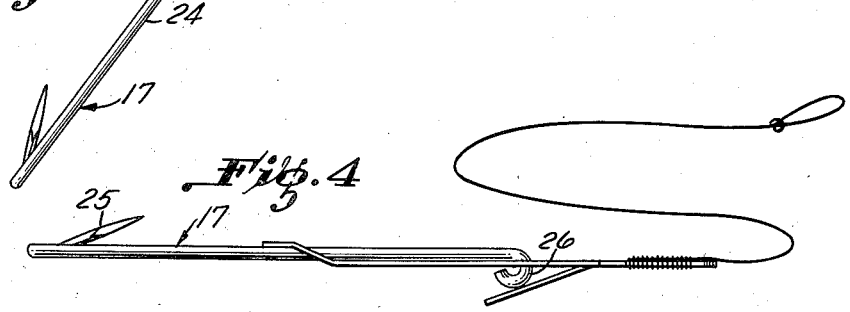
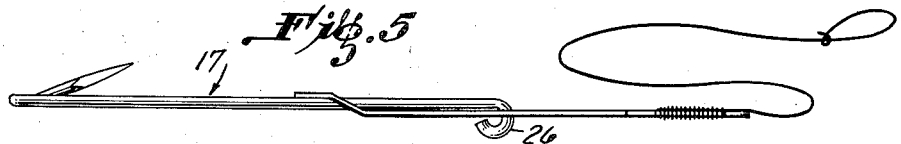
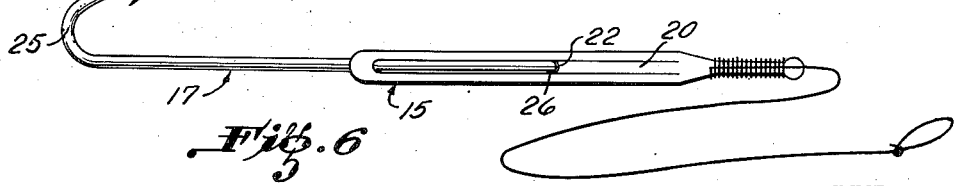
INVENTOR
HERBERT E. RACH
BY *Augustus M. Henry*
ATTORNEY

United States Patent Office 2,780,886
Patented Feb. 12, 1957

2,780,886

SNELL ADAPTER FOR FISHHOOKS

Herbert E. Rach, Wantagh, N. Y.

Application November 28, 1955, Serial No. 549,266

4 Claims. (Cl. 43—44.83)

The subject of this invention is a novel and valuable article of manufacture constituting a device for serving for the first time at least one very serious need of the angler.

The new device of the present invention will herein be called an adapter, and the same in construction and function is to be sharply contradistinguished from an artificial bait or lure of any kind.

In providing the new device, an object of the invention is to produce a device, to wit, the adapter aforesaid, adapted to be used for the purpose of securing a fish hook to a snell in such a manner that the hook may be readily and speedily attached yet subsequent to the attachment be capable of being just as expeditiously deliberately detached to permit quick substitution of another hook, or, if the fishing be ended, to permit the hook to be stored in a tackle box in a way to avoid the previous entanglement of snells and permanently attached hooks.

Thus another and very important objective attained by the invention is a perfect solution of a problem long troublesome if not almost an intolerable nuisance to the fisherman; which problem arises from the fact that (with as usual a container for the hooks and snells carried on a fishing expedition and within which are stored all of the various and often numerous hooks each individually attached to its snell), the hooks become snarled and entangled with each other and with the snells, and vice versa, thereby to present what looks like an inextricable confusion-puzzle, often proving to be substantially such, to the fisherman who when arriving at the selected fishing spot he opens his tackle box with the idea of selecting a desired hook and its attached snell suitable according to his judgment to the nature of the fishing spot where he intends to station himself, with due regard to sunshine and shade, temperature of the water and other conditions which his experienced eye determines are appropriate to successful fishing.

Another object is to provide a device as above which, so constructed as to function in a manner directly opposite to that of the intended action of a spoon as employed as a lure for instance in trolling, can be absolutely relied on to prevent flip-flopping of the hook on the snell.

A further object is to provide a device having all the advantages so far enumerated, and which, also, is of such a construction as to permit the use of different size hooks on the same snell.

Still another object of the invention, to satisfy the aim of providing an adapter so made that the same will not ever possibly act as a spinning device, is to produce an adapter which has features of construction such that the adapter, following mounting of a hook thereon, will extend straight, or in one plane, with, preferably, the hook so attachable to the adapter that there will also be maintained in said plane substantially the entirety of the length of the hook all the way from the normally free end of the shank to the tip of the barb at the opposite end of the hook.

Yet another object of the invention is to provide an adapter as already detailed, and one in which, even while it may satisfy the object last-above mentioned, can be made very thin and attenuated, even while having a cut in waist intermediate its length, and which can, for instance, be stamped of very thin tempered steel or other suitable metal or other feasibly usable material (as a plastic, as now or hereafter developed), and so resiliently biased as always, after attachment of the hook thereto, to return to its normal uniplanar condition.

Still a further object of the invention is to provide an adapter as already stated, and one adapted particularly to satisfy the condition immediately above explained, which, nevertheless, is so constructed as to insure absolutely that the hook can never accidentally be detached from the adapter; which construction involves the employment of a spring tongue struck out from the material of the blank of which the adapter is formed, and, in combination with said tongue, a structure always to be depended on to act relative to the hook as what may be called a non-backer-outer means.

Various other objects, features and advantages of the invention will hereinafter become apparent or be expressly pointed out as this specification proceeds, in connection with which a detailed description will be included therein making reference to the accompanying drawing illustrating merely one although a now favored one of the various possible embodiments of the invention; in which drawing:

Fig. 1 is a perspective view, showing said embodiment, permanently attached to the snell;

Fig. 2 is a fragmentary, enlarged, longitudinal section taken substantially on the line 2—2 of Fig. 1;

Fig. 3, showing the adapter in side elevation, illustrates the relative position of a fish hook at the initial stage of attaching the same to the adapter;

Fig. 4 is a view similar to Fig. 3, but with the shank of the fish hook now parallel with the flat of the adapter; and with the hook stationed in readiness for a movement thereof in the direction of the arrow of Fig. 4; and Fig. 5 is a view like Figs. 3 and 4, showing the hook now absolutely accidentally inseparable from the adapter, this interlock condition resulting from pulling movement on the hook in the direction of the arrow of Fig. 4.

Similar reference numerals refer to similar parts throughout the several views of the drawing.

Referring now to the drawing more in detail, the new adapter as a whole is designated 15. The snell is indicated at 16, and the hook as a whole is marked 17.

The adapter 15 is formed of a blank of a material of any of the kinds already specified, and is made very, very thin, desirably having a thinness of the order of 1/64" or a few thousandths less. At one end the adapter has a slight rounded enlargement 18 having a neck connection as shown to the remainder of the adapter; around which neck connection the outer end of the snell may be tightly wrapped as shown and tied. The adapter near its opposite end has an elongate aperture 19. Struck from the adapter is a tongue 20, this tongue as herein shown being about 40% of the width of the adapter at its widest part and also as herein shown being about 35–40% of the length of the adapter exclusive of the enlargement 18 and the neck connection of the latter to the main body of the adapter. Due to the natural or suitably imparted (as by tempering) resiliency of the material of which the adapter is formed, the tongue 20 is a spring tongue. It is normally biased to lie uniplanarly with the remainder of the adapter. At the free end of said tongue an aperture is provided through the adapter, said aperture being partially formed by a semi-circularly concave end 22 of said tongue free end and partially formed by a semi-circularly cut out 23 through the adapter located directly opposite the free end of the tongue when the latter extends normally in the same plane as the remainder of the adapter.

The hook 17 is standard in that it incorporates a straight shank 24 and a barb 25, while the hook as it is herein shown includes an almost but not quite closed eye 26 at the end of the shank opposite its barbed end. Also as is now preferred, said eye is shown as arranged so that the plane of its flat is substantially at right angles to the plane of the main curvature of the barb away from the shank.

The idea is to make the adapter as small and as inconspicuous as possible, and toward that objective, the outer end of the elongate aperture 19 desirably would be moved as much closer to the end of the adapter shown at the left in Fig. 1 as would still retain adequate strength of the adapter at said end thereof in view of its thinness and the quality of the material of which it is formed. Also, with the same aim in mind, the adapter could have an incut waist portion such as indicated by the dot and dash delineations 27 in Fig. 1. Further to make the adapter as narrow and as unobtrusive as possible, it may desirably be tinted various colors to camouflage its presence between the snell and the hook on which is impaled the bait.

The structure of the adapter is such, it will be noted, as to permit the use of different size hooks on the same snell, that is, through the intermediary of the adapter. The hook being more rigid than the adapter, the latter for all intents and purposes remains straight and unbent.

These and other advantageous features dill be instantly appreciated from a study of the drawing.

The operation of attaching a hook to the adapter (that is, via the adapter to the snell) is as follows:

First, as shown in Fig. 3, the eyed end of the shank of the hook is sent upward through the elongate aperture 19. Next, the shank of the hook having ceen pushed through the said aperture 19 until the terminally curved part of the eye 26 is over the tongue 20 say at a point about half way along the length of the latter, the eyed end of the hook is swung down forcing the tongue 20 elastically to yield as shown in Fig. 4; finally, the hook is pulled forward, in the direction of the arrow in Fig. 4, until the root portion of the curl of the hook shank which forms the eye 26 becomes housed in the aperture 22—23. The instant this happens, the tongue 20 snaps back into the position shown in Figs. 1, 2 and 6, and the non-backer-outer means of the present invention for absolutely preventing accidental separation of the hook from the adapter, and consequently from the snell and in turn from the fish line, becomes and remains 100% effective.

As already pointed out, the adapter should be as small and as inconspicuous as possible, which means it should not only be as short in length as practicable, but also of as thin a sheet material as is feasible, and of quite narrow width, or slenderized. By slenderized is meant that the adapter should have a length substantially at least ten times its maximum width.

As will be understood, only one of the many possible and possibly widely diverse embodiments of the invention has been shown. This has been described with considerable particularity of detail, not for purposes of limitation, of course, but in the attempt to make clear the advantages and capabilities of the present invention. As will be understood, variations and modifications are possible; and the scope of protection contemplated is to be taken solely or primarily from the appended claims, interpreted as broadly as is consistent with the prior art if any.

I claim:

1. An adapter for connection to a snell and for having a fish hook attachable thereto but removable therefrom only deliberately, said hook being of the familiar type having a barb and at its barb-opposite end an eye, said eye being partially open, said adapter comprising a thin, elongate, slenderized substantially uniplanar member of resilient sheet material, said member having a single unit tongue struck therefrom extending longitudinally thereof and said member further having a first opening and a second opening, said first opening being elongate in the direction of length of said member, said second opening being substantially circular with its diameter substantially equal to the width of said tongue, the outline of said second opening being partially established by the shape of said tongue at its free end transversely of the tongue, whereby the fish hook may be attached to the adapter in a manner to prevent subsequent accidental detachment of the fish hook from the adapter, by passing the eye carrying end of the first hook end first in one direction through the said first opening and next in the opposite direction through said second opening and then pulling the fish hook in a direction to advance said eye-like formation as close as possible to the first-named opening thereby to free said tongue for elastic return to uniplanarity with the remainder of the adapter.

2. An adapter as defined in claim 1, in which said adapter incorporates a non-backer-outer means for the fish hook relative to the adapter following attachment of the fish hook to the adapter, said means consisting solely of said eye on the fish hook and said free end of the tongue at the said second opening, said opening being reduced in the dimension across said second member in the direction of the length of the adapter, to less than the size of the said eye-formation, said eye-formation being substantially C-shaped.

3. An adapter for connection to a snell and for having a fish hook attachable thereto but removable therefrom only deliberately, said adapter comprising a thin, elongate, slenderized substantially uniplanar member of resilient sheet material, said member having a first opening and also having only a single tongue struck therefrom extending longitudinally thereof, said member further having a second opening the outline of which is partially established by the free end of said tongue, whereby a fish hook having an eye-like formation at the butt end of its shank may be attached to the adapter by passing said butt end first in one direction through the first-named opening and next in the opposite direction through the second-named opening and then pulling the fish hook in a direction to advance said eye-like formation as close as possible to the first-named opening, all parts of the adapter being so elastically biased that normally the tongue is uniplanar with the remainder of the adapter but is resiliently yieldably inclinable, in response to pressure against the flat surface of the same, away from the plane of the remainder of the adapter so as automatically to return to its uniplanar position with the remainder of the adapter on release of said pressure.

4. An adapter for connection to a snell and for having a fish hook attachable thereto but removable therefrom only deliberately, said adapter comprising a thin, elongate, slenderized substantially uniplanar member of resilient sheet material, said member having an elongate opening, said member also having only a single tongue struck therefrom extending longitudinally thereof, said member further having a second opening the outline of which is partially established by the free end of said tongue, whereby a fish hook having an eye-like formation at the butt end of its shank may be attached to the adapter by passing said butt end first in one direction through the first-named opening and next in the opposite direction through said second opening and then pulling the fish hook in a direction to advance said eye-like formation as close as possible to the first-named opening, all parts of the adapter being so elastically biased that normally the tongue is uniplanar with the remainder of the adapter but is resiliently yieldably inclinable, in response to pressure against the flat portion of the same, away from the plane of the remainder of the adapter so as automatically to return to uniplanarity with the remainder of the adapter on release of said pressure, said tongue at its free end being flat and in the plane of the member when in locking position, said eye-formation being substantially C-shaped, and said second-named opening being substantially circular.

References Cited in the file of this patent

UNITED STATES PATENTS

| | | |
|---|---|---|
| 1,433,197 | Gardner | Oct. 24, 1922 |
| 1,752,088 | Huntington | Mar. 25, 1930 |